United States Patent [19]

Pao et al.

[11] 3,851,187

[45] Nov. 26, 1974

[54] HIGH SPEED SHIFT REGISTER WITH T-T-L COMPATIBILITY

[76] Inventors: Henry C. Pao, 1105 Lexington St., Waltham, Mass. 02154; Richard L. Donnerstein, 37 Crescent St., Cambridge, Mass. 02138; Stephen A. Steiner, 6 Fair Oaks Ter., Lexington, Mass. 02173

[22] Filed: July 31, 1972

[21] Appl. No.: 276,541

Related U.S. Application Data

[63] Continuation of Ser. No. 121,376, March 5, 1971, abandoned.

[52] U.S. Cl. ....... 307/221 R, 307/224 R, 307/299 A

[51] Int. Cl. ....................... G11c 19/00, H03k 21/00

[58] Field of Search ............ 307/221 R, 224 R, 236, 307/238, 299 A; 382/37, 118

[56] References Cited

UNITED STATES PATENTS

| | | | |
|---|---|---|---|
| 3,171,982 | 3/1965 | Ruhland | 307/236 X |
| 3,281,593 | 10/1966 | Mendelsohn | 246/249 |
| 3,297,950 | 1/1967 | Lee | 307/221 R |
| 3,538,348 | 11/1970 | Hillis et al. | 307/238 |
| 3,553,659 | 1/1971 | Englund | 340/173 |
| 3,573,754 | 4/1971 | Merryman | 307/238 X |
| 3,614,469 | 10/1971 | Heightley | 307/221 R |

*Primary Examiner*—Stanley D. Miller, Jr.
*Attorney, Agent, or Firm*—Richard M. Sharkansky; Joseph D. Pannone; Milton D. Bartlett

[57] ABSTRACT

A binary shift register, suitable for high density monolithic integrated circuit fabrication, wherein each one of a plurality of coupled storage stages includes a first and second bistable multivibrator. A binary signal applied to each storage stage is first stored in the first bistable multivibrator and then transferred to the second bistable multivibrator so as to permit availability of the first multivibrator for the storage of an updated binary signal. The binary signal stored in any storage stage is defined as the relative polarity of a voltage established therein. The binary signal stored in any storage stage is shifted to the storage stage coupled thereto by the latter such storage stage responding to the relative polarity of the voltage established in the former stage.

3 Claims, 3 Drawing Figures

HIGH SPEED SHIFT REGISTER WITH T-T-L COMPATIBILITY

This is a continuation of application Ser. No. 121,376 filed Mar. 5, 1971, and now abandoned.

BACKGROUND OF THE INVENTION

This invention relates generally to shift registers and more particularly to shift registers suitable for high density monolithic integrated circuit fabrication and capable of operating at data rates greater than 10 MHz.

As is known in the art, digital computation systems employ numerous shift registers to perform many operations required by such systems. It is also known that large scale integrated circuitry is desirable for the fabrication of such registers. This integration is accomplished, to a large degree, by fabricating electrical circuits on monolithic integrated circuit chips. There are two general classes of active devices fabricated on such chips for use in shift register design. These are: (1) metal oxide semiconductor field effect transistors (MOSFET); and, (2) bipolar transistors. Shift registers employing MOSFET devices are capable of higher chip density packaging as compared with those employing bipolar devices; however, the former shift registers are presently limited to a data rate of about 5 MHz. Also, MOSFET shift registers are inconvenient because: (1) such shift registers require two relatively high voltage pulse generators; and, (2) MOSFET devices are not compatible with Transistor-Transistor-Logic (T-T-L) circuits, such circuits being generally employed in the computation system. Shift registers employing bipolar devices are capable of operating at data rates of greater than 10 MHz; however, the bit storage density per chip is much lower than such density capable with MOSFET devices because of additional circuitry required with bipolar devices. For example, an 8 storage stage shift register employing bipolar devices and capable of operating at 10 MHz requires about 17 electrical components per storage stage. Therefore, one monolithic integrated shift register circuit chip, 100 mils square in area, employing bipolar devices can have fabricated thereon 16 storage stages.

SUMMARY OF THE INVENTION

It is therefore the primary object of the invention to provide a binary shift register having a higher monolithic integrated circuit packaging density and higher data rate capability than has been known heretofore.

This and other objects of the invention are attained generally by providing, on a monolithic integrated circuit chip, a shift register comprising a plurality of identical storage stages, each such storage stage including a first and second bistable element and a clock pulse means for shifting a binary signal through such stages in a conventional manner. The first bistable element in each storage stage is responsive to a first train of clock pulses and the second bistable element in each storage stage is responsive to a second train of clock pulses, such first and second train being interlaced one with the other, successive ones of the bistable elements assuming one or the other of its stable conditions in accordance with the polarity of a voltage established across its input terminals.

The stable condition assumed by a bistable element defines the relative polarity of a voltage established between a pair of output lof such bistable element. The state of any storage stage is read by providing means, connected to the output terminals of the second bistable element of such storage stage, for responding in accordance with the relative polarity of the voltage established between such output terminals.

BRIEF DESCRIPTION OF THE DRAWINGS

Other objects and many of the attendant advantages of the invention will be readily appreciated as the same becomes better understood by reference to the following detailed description when considered in connection with the following figures wherein.

DESCRIPTION OF THE PREFERRED EMBODIMENTS

Figures 1, 2:
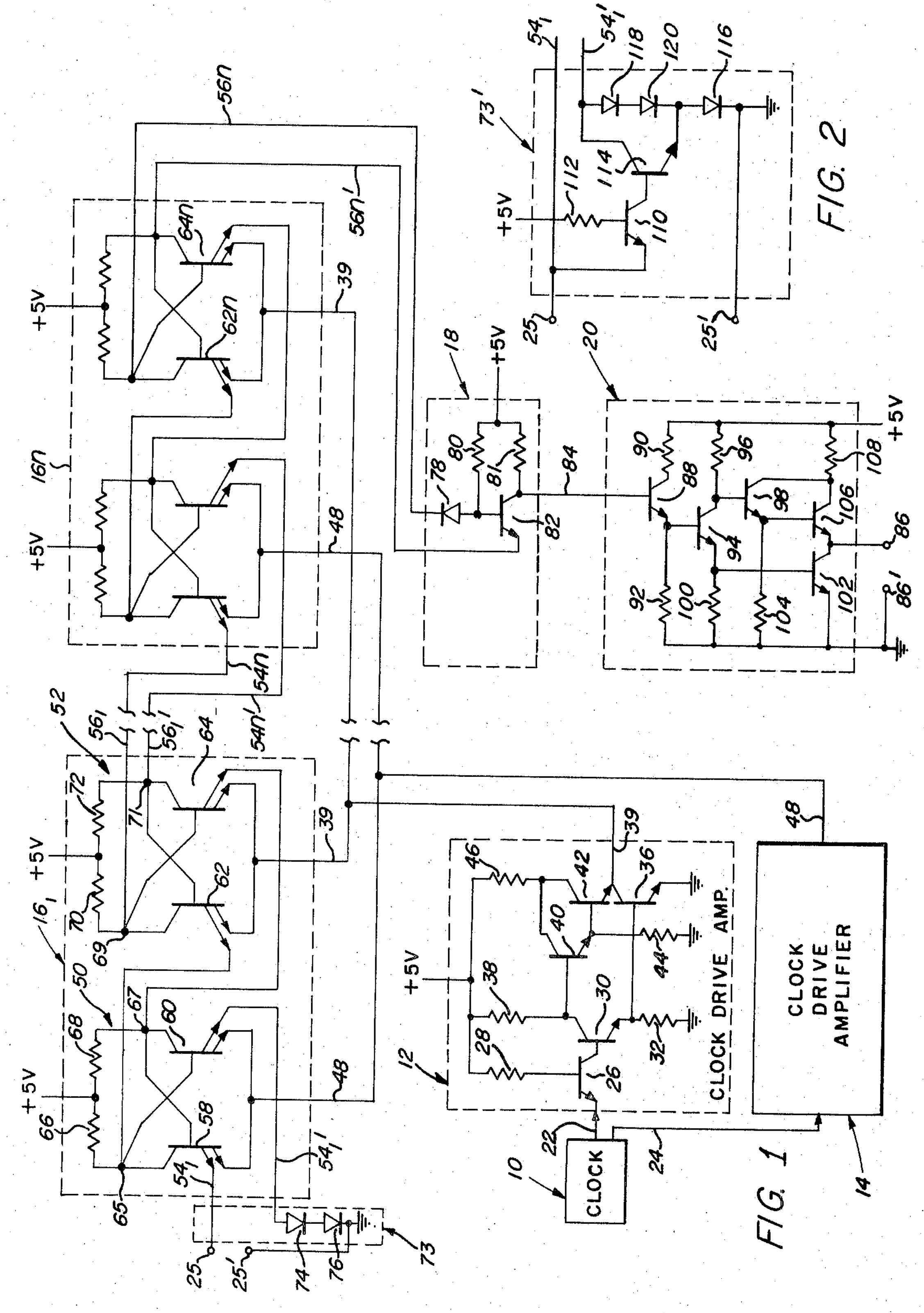
FIG. 1 shows a shift register embodying the features of the invention.
FIG. 2 shows an alternate voltage reference means employable with the shift register to make such shift register T-T-L compatible; and, FIG. 3 shows a portion of an integrated circuit chip, somewhat distorted, having formed thereon elements of the shift register.

Referring now to FIG. 1, it is noted than an *n* stage shift register is shown, such register being comprised of a clock pulse generator 10; a pair of identical clock drive amplifiers 12, 14; *n* identical storage stages $\mathbf{16}_1$–**16*n* (where, for convenience only the first such stage $\mathbf{16}_1$ and last such stage 16*n* are shown); voltage polarity sensitive switching means 18; and, an output drive amplifier 20.** It is here noted that the *n* stage shift register is comprised of transistors and diodes having the following characteristics: When a transistor is "on" the voltage between the emitter electrode and collector electrode of such transistor is substantially 0.3 volts and the voltage between the emitter electrode and the base electrode is substantially 0.7 volts; when a diode is "on" the voltage across the electrodes of such diode is substantially 0.7 volts. As is known in the art, such characteristics are typical of conventional switching transistors and diodes. It is further noted that the *n* stage shift register shown in FIG. 1 here shown employs positive voltage logic, that is, a "1" signal is represented by a +3.5 to +5 volts and a "0" signal by a voltage of +0.3 volts.

Clock pulse generator 10 produces two trains of interlaced trigger pulses, one train of trigger pulses being applied to line 22 and the other train of trigger pulses being applied to line 24. The clock pulse generator is of any conventional design with the following characteristics to achieve maximum operating rate for the shift register: (1) the rate of trigger pulses on lines 22 and 24 is equal to the rate at which binary signals are applied to the *n* stage shift register, such binary signals being applied as voltages between terminals 25 – 25′ generated by digital computation apparatus, not shown; (2) each of the trigger pulses have an "on" time equal to its "off" time; and, (3) the trigger pulses on line 24 are delayed in time one-half period with respect to the trigger pulses on line 22 (that is, trigger pulses on lines 22 and 24 occur at mutually exclusive time intervals).

Clock drive amplifiers 12 and 14 are of identical construction. Each amplifier is designed to supply sufficient current to all storage stages connected thereto. An exemplary drive amplifier, here 12, will therefore be discussed. As shown, a transistor 26 has its emitter electrode connected to line 22, its base electrode connected to a suitable supply, here +5 volts, not shown, through registor 28, as shown, and its collector electrode connected to the base electrode of transistor 30. Transistor 30 has its emitter electrode connected both to ground potential through resistor 32 and to the base electrode of transistor 36 and its collector electrode connected both to a suitable power supply, here +5 volts, not shown, through resistor 38, as shown, and to the base electrode of transistor 40. Transistor 36 has its emitter electrode connected to ground potential and its collector electrode connected to both line 39 and the emitter electrode of transistor 42. Transistor 40 has its emitter electrode connected to both ground potential through resistor 44 and the base electrode of transistor 42. The collector electrodes of transistors 40 and 42 are connected to the +5 volt power supply, not shown, through resistor 46, as shown. It is here noted that a line 48 connected as shown to enable drive amplifier 14 is analogous to line 39.

In operation, when a trigger pulse, here +1.4 to +5 volts, is applied to line 22, transistor 26 turns "off," whereas transistors 30 and 36 turn "on" and the voltage on line 39 is +0.3 volts. Current is supplied to line 39 by transistors 40 and 42. However, when there is an absence of a trigger pulse on line 22, that is, when 0 to +0.8 volts is applied to line 22, transistor 26 is "on," whereas transistors 30 and 36 are "off" and the voltage on line 22 is approximately +3.6 volts. Therefore, because the trigger pulses applied to line 24 are delayed one-half period with respect to the trigger pulses on line 22, the voltage of the signals on lines 39 and 48 will be complements one of the other, that is, when line 39 is at +3.6 volts, line 48 will be at +0.3 volts and visa versa.

Because each storage stage $16_1$-$16n$ is identical, only one exemplary stage, here $16_1$, will be discussed in detail. Storage stage $16_1$ includes: A pair of bistable multivibrators, 50, 52; a pair of input lines $54_1$, $54_1'$ connected to bistable multivibrator 50; and a pair of output lines $56_1$, $56_1'$ connected to bistable multivibrator 52. Each such multivibrator is made up of a pair of directly by coupled double emitter transistors. In particular, bistable multivibrator 50 is comprised of transistors 58, 60 and bistable multivibrator 52 is comprised of transistors 62, 64. As shown, transistor 58 has its base electrode connected to the collector electrode of transistor 60, both such electrodes being connected to terminal 67, such terminal being connected to a suitable power supply, here +5 volts, not shown, through resistor 68. Transistor 60 has its base electrode connected to the collector electrode of transistor 58, both such electrodes being connected to terminal 65, such terminal being connected to the +5 volt power supply, not shown, through resistor 66, as shown. Likewise, the base and collector electrodes of transistors 62 and 64 are connected in a similar manner as those transistors 58 and 60; in particular, the collector electrode of transistor 62 and base electrode of transistor 64 are connected to terminal 69, such terminal being connected to the +5 volt power supply, not shown, through reisitor 70 and the base electrode of transistor 62 and collector electrode of transistor 64 are connected to terminal 71, such terminal being connected to the +5 volt power supply, not shown, through resistor 72, as shown. Transistor 58 has one emitter electrode connected to terminal 25 by means of line $54_1$. Transistor 60 has one emitter electrode connected to one emitter electrode of transistor 58, as shown, both such electrodes being connected to line 48, as shown. Transistor 60 has its other emitter electrode connected to ground potential through voltage reference means 73 via line $54_1'$. Voltage reference means 73 here includes diodes 74 and 76 connected as shown. Transistor 64 has one emitter electrode connected to terminal 67 and a second electrode connected to line 39 as shown. Transistor 62 has soone emitter electrode connected to terminal 65 and a second emitter electrode connected to line 39, as shown. Output lines $56_1$ and $56_1'$ are connected to terminals 69 and 71, respectively. Output lines $56_1$ and $56_1'$ are connected to lines $54_2$ and $54_2'$ (not shown) of a second storage stage (not shown) connected to storage stage 16. That is, output lines $56_{n-1}$ and $56_{n-1}'$ of the next to last storage stage (not shown) are connected respectively to input lines $54_n$ and $54_n'$ of storage stage **16*n*. However, it is here noted in passing that output lines 56*n* and 56*n*' of storage stage 16n are connected to polarity sensitive switching means 18**, as shown. The details of such means will be described later.

In understanding the operation of exemplary storage stage $16_1$, it is here noted that because of the bistable characteristic of bistable multivibrators 50 and 52, when one transistor comprising such multivibrator is "on" the other transistor is "off." That is, in any stable condition the voltage between the collector electrodes of each multivibrator transistor is ±0.4 volts, the polarity of the voltage being dependent on which one of the transistors is "on." In particular, when transistor 60 is "on" (and therefore transistor 58 is "off") the polarity of the voltage between terminals 65 and 67 is, say, positive, whereas when transistor 58 is "on," such voltage polarity is, say, negative. Likewise, when transistor 64 is "on" the polarity of the voltage between terminals 69 and 70 is, say, positive, whereas when transistor 62 is "on," such voltage polarity is, say, negative. Therefore, the binary signal stored in storage stage 16 can be determined by detecting the relative polarity of the voltage established between terminals 69 and 71 (i.e., lines $56_1$ and $56_1'$. Likewise, the binary signal stored in the storage stage being monitored, here **16*n*, can be determined by sensing the relative voltage polarity established between lines 56*n* and 56*n*'**.

In operation, a binary signal applied to terminals 25, 25' is entered into bistable multivibrator 50 when line 48 has applied thereto +3.6 volts, whereas a binary signal is not entered therein when line 48 has applied thereto +0.3 volts. In particular, if the voltage on line 48 is +3.6 volts and the binary signal applied to storage stage $16_1$ is a "1," (i.e., greater than +3.5 volts) transistor 58 will turn "off" if it had previously been "on" or will remain "off" if it had previously been "off" (because the voltage on the emitter electrode of transistor 60 connected to voltage reference means 73 will have thereon a lower voltage, [i.e., +1.4 volts]), and conversely, if the binary signal applied to storage stage $16_1$ is a "0," (i.e., +0.3 volts) transistor 58 will remain "on" if it had previously been "on" and will be placed in an "on" condition if previously "off" (because voltage reference means 73 limits the voltage on line 54' to +1.4 volts minimum). A little thought will make it apparent that multivibrator 50 responds to the relative polarity of the voltage between input lines $54_1$ and $54_1'$. In particular, when the polarity of such voltage is positive transistor 60 will be "on," whereas when such polarity is negative transistor 58 will turn on. However, if the voltage applied to line 48 is +0.3 volts, then the binary signal applied to input lines $54_1$ and $54_1'$ does not effect the stable condition of bistable multivibrator 50. Bistable multivibrator 62 operates in much the same manner, except that the binary signal applied thereto is defined by the relative polarity of the voltage established between terminals 65 and 67. In particular, if line 39 has +0.3 volts applied thereto, the state of transistors 62 and 64 will not change regardless of the polarity in voltage between terminals 65 and 67. However, if the voltage applied to line 39 is +3.6 volts, the state of transistors 62 and 64 will depend on the relative polarity of the voltage between terminals 65 and 67; in particular, if terminal 65 is of higher voltage than that of terminal 67, transistor 62 will turn "off" and transistor 64 will turn "on," whereas if the voltage on terminal 65 is lower than that on terminal 67, transistor 62 will turn " on" and transistor 64 will turn "off."

Therefore, in summary, storage cell 16 has the following characteristics: (1) when the voltage on line 48 is +3.6 volts, a binary signal applied to terminals 25-25' (and therefore line 54-54') is entered into bistable multivibrator 50 and because the voltage on line 39 is +0.3 volts during this interval bistable multivibrator 52 does not respond to the voltage polarity between terminals 65 and 67; (2) when the voltage on line 48 changes to +0.3 volts, a binary signal applied to terminals 25-25' is not entered into bistable multivibrator 50; however, because the voltage on line 39 is +3.6 volts during this interval, bistable multivibrator 52 does respond to the polarity of the voltage established by bistable multivibrator 50. (In particular, if transistor 58 is "on," transistor 62 will be driven "on," whereas if transistor 58 is "off," transistor 62 will be driven "off.") Therefore, a little thought will make it apparent that, because lines 48 and 39 are connected to all storage stages **16-16*n*, a binary signal applied to terminals 25-25' will shift from storage stage $16_1$ to $16_2$ (and eventually to 16*n*) in a conventional manner each time line 48** has applied thereto +3.6 volts.

The binary signal stored in any storage stage, here exemplary storage stage **16*n*, is read by detecting the polarity of the voltage established between line 56*n* and 56'*n* by voltage polarity sensitive switching means 18. Voltage polarity sensitive switching means 18 is comprised of a diode 78, resistors 80, 81 and a transistor 82. The emitter electrode of transistor 82 is connected to line 56'*n*; the base electrode is connected both to a suitable power supply, here +5 volts, not shown, through resistor 80, as shown, and the anode of diode 78; and, the collector electrode is connected both to the +5 volt power supply through resistor 81 as shown and output drive amplifier 20 via line 84. In operation, when the voltage on line 56'*n* is greater than the voltage on line 56*n* (that is, the transistor 65*n* is "off"), transistor 82 will be "off" and the voltage on line 84 will tend towards +5 volts, being limited, however, by, inter alia, resistor 81 to + 2.1 volts for reasons to become apparent; whereas, when the voltage on line 56'*n* is less than the voltage on line 56*n* (that is, transistor 64*n* is "on"), transistor 82 will turn "on." However, the maximum voltage on line 84** will be +1.6 volts.

Output drive amplifier 20 responds to the voltage on line 84 in the following manner: (1) when the voltage on line 84 tends to +5 volts, the voltage between terminals 86-86' is +0.3 volts (i.e., "0"); and, (2) when the voltage on line 84 is +1.6 volts (or less) the voltage between terminals 86-86' is +3.6 volts, (i.e. "1"). Transistor 88 has its base electrode connected to line 84; its collector electrode connected to a suitable power supply, here +5 volts, not shown, through resistor 90; and, its emitter electrode connected to both ground potential through resistor 92 and to the base electrode of transistor 94. Transistor 94 has its emitter electrode connected both to ground potential through resistor 100 and the base electrode of transistor 102 and its collector electrode connected both to the base electrode of transistor 98 and the +5 volt power supply, not shown, through resistor 96. Transistor 98 has its emitter electrode connected to ground potential through resistor 104 and its collector electrode connected to the collector electrode of transistor 106, both such electrodes being connected to the +5 volt power supply through resistor 108. Transistor 102 has its emitter electrode connected to ground potential and its collector electrode connected to the emitter electrode of transistor 106, both such electrodes being connected to terminal 86. Terminal 86' is connected to ground potential. In operation, when the voltage on line 84 tends towards +5 volts because the voltage on line **56'*n* is greater than the voltage on line 56*n*, transistors 88, 94 and 102 turn "on," thereby limiting the voltage on line 84 to about +2.1 volts, and the voltage on terminal 86 is +0.3 volts. Conversely, when the voltage on line 84 is +1.6 volts (or less), because the voltage on line 56'*n* is less than the voltage on line 56*n*, transistor 102 is "off" because the voltage on the base electrode of transistor 102 can not be greater than +0.7 volts. Therefore, the voltage on terminal 86 will be +3.6 volts (because of the 1.4 volt drop across the base-emitter junctions of both transistors 98 and 106**).

Referring now also to FIG. 2, voltage reference means 73' is shown, such voltage reference means, when employed by the shift register shown in FIG. 2 in place of the voltage reference means 73 shown, permits such shift register to be T-T-L compatible. In particular, such shift register will operate in the general manner previously described except that the following positive voltage logic may be used: A "1" signal is a voltage greater than +1.4 volts, whereas a "0" signal is a voltage less than +1.4 volts. As shown, transistor 110 has its base electrode connected to a suitable power supply, here +5 volts, not shown, through resistor 112, as shown; its emitter electrode connected to terminal 25 and line $54_1$; and its collector electrode connected to the base electrode of transistor 114. Transistor 114 has its emitter electrode connected to ground potential through diode 116, as shown, and its collector electrode connected to line $54_1'$ and to its emitter electrode through diodes 118 and 120, as shown. Terminal 25' is connected to ground potential. In operation, when the signal on terminal 25 is "1," transistor 110 is "off;" however, the base-collector junction of such transistor is forward biased and transistor 114 is driven "on." Therefore, the voltage on line $54_1'$ is +1.0 volts when the voltage on line $54_1$ is at least +1.4 volts, and transistor 60 is driven "on" (i.e., a "1" will be entered into bistable multivibrator 50 if line 48 has a "1" applied thereto). Conversely, when the signal on terminal 25 is "0," transistor 110 will prevent transistor 114 from turning "on," and the voltage on line $54_1'$ will be limited to +2.1 volts by diodes 116, 118 and 120; however, because the voltage on line $54_1$ is +1.4 volts or less, and the voltage on the base electrode of transistor 58 is +2.4 volts or more, transistor 58 has greater than 0.7 volts across its base-emitter junction to turn it "on" (i.e., a "0" will be entered into bistable multivibrator 50 if line 48 has a "1" applied thereto). A little thought will make it apparent that the state assumed by bistable multivibrator 50 is dependent on the relative polarity of the voltage between lines $54_1$ and $54_1'$.

Figure 3:
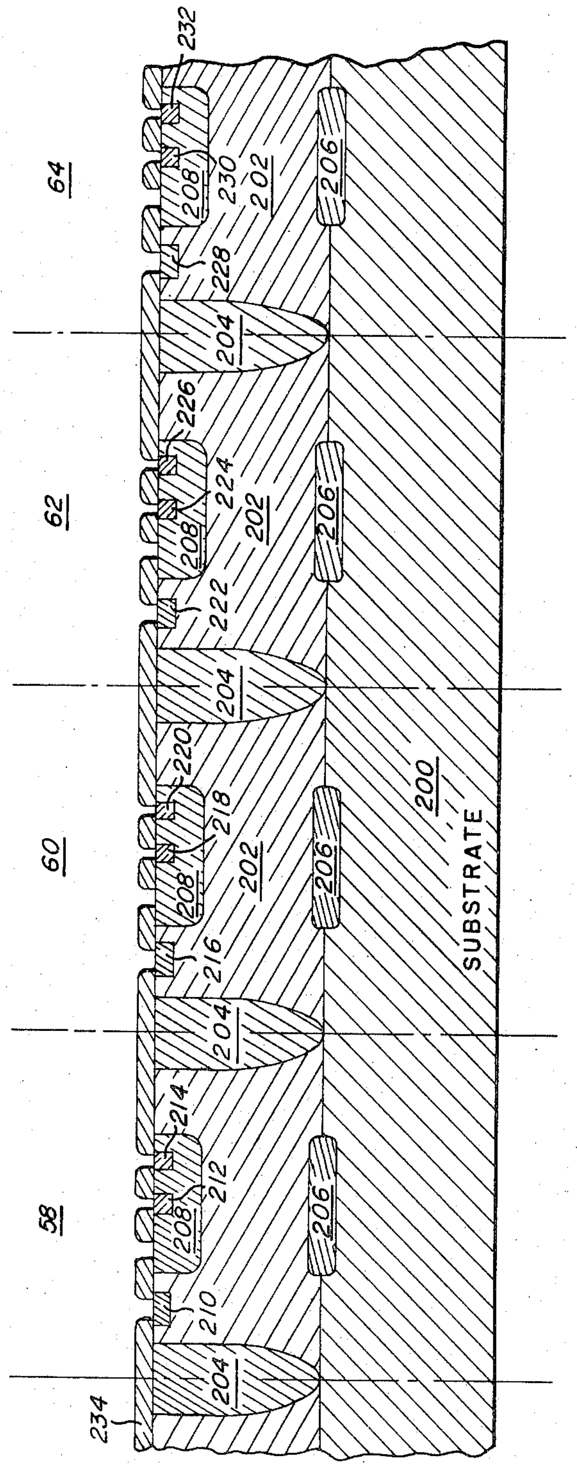

FIG. 3 shows a portion of a monolithic integrated circuit chip having formed thereon exemplary transistors 58, 60, 62 and 64. Such chip includes: A substrate, 200, here of silicon; epitaxial regions, 202, here of N material; isolation regions, 204, here of $P^+$ material, for isolating the transistors; subcollector regions 206, here of $N^+$ material; P diffusion regions, 208, such regions being used for the base electrodes of the transistors; and, $N^+$ diffusion regions 210–232, $N^+$ diffusion regions 210, 216, 222 and 228 being used as collector electrodes and regions 212, 214, 218, 220, 224, 226, 230 and 232 being used as emitter electrodes of the transistors. An insulation layer 234 of $S_iO_2$ is shown; however, the metalization used to connect the electrodes of the transistors is not shown. Such monolithic integrated circuit chip can be fabricated using conventional methods, such as those described in Thin Film Technology by Robert W. Berry, Peter M. Hall and Murray T. Harris, Van Nostrand Reinhold Company, New York, 1968.

While the invention has been particularly shown and described with reference to the preferred embodiments thereof, it would be understood by those skilled in the art that various changes in form and details may be made therein without departing from the spirit and scope of the following claims.

What is claimed is:

1. A shift register having a plurality of successively coupled storage stages, each such storage stage comprising: an input and an output bistable multivibrator, each one thereof having a pair of directly coupled transistors, the collector electrode of each one of the pair of transistors of the input bistable multivibrator being connected, respectively, to an emitter electrode of a different one of the pair of transistors of the output bistable multivibrator; and a differential sensor, connected between the collector electrodes of the pair of transistors of the output bistable multivibrator, for detecting the condition of such output bistable multivibrator by sensing the relative polarity of a voltage developed between such collector electrodes.

2. A shift register having a plurality of successively coupled storage stages, each such storage stage comprising:

a. an input and an output bistable multivibrator, each one thereof having a pair of directly coupled multi-emitter transistors, the collector electrode of each one of the transistors of the input bistable multivibrator being connected respectively to a first emitter electrode of a different one of the pair of transistors of the output bistable multivibrator;

b. means, connected to one of the emitter electrodes of each one of the pair of transistors of the input bistable multivibrator for coupling such bistable multivibrator to an input enable signal source;

c. means, connected to a second emitter electrode of each one of the pair of transistors of the output bistable multivibrator to a transfer enable signal source; and d. a differential sensor connected between the collector electrodes of the pair of transistors of the output bistable multivibrator, for detecting the condition of such output multivibrator by sensing the relative polarity of a voltage developed therebetween.

3. A shift register suitable for integrated circuit fabrication and compatible with transistor-transistor-logic (T-T-L) circuitry, comprising:

a. a plurality of storage stages including an input storage stage and successively coupled storage stages, each one of the plurality of storage stages including a first and a second bistable multivibrator, each such first and second multivibrator having a pair of interconnected transistors, each one of the pair of transistors having a control emitter electrode and a data emitter electrode, the base electrode of each one of such pair of transistors being connected directly to the collector electrode of the other one of such pair of transistors at a terminal, whereby a pair of terminals is formed for each first and second bistable multivibrator, the pair of terminals formed for the first bistable multivibrator of each one of the plurality of storage stages being directly connected to the data emitter electrodes of a different one of the pair of transistors forming the second bistable element of the succeeding one of the plurality of storage stages;

b. first means, coupled to the control emitter electrodes of the pair of transistors forming the first bistable multivibrator, for enabling such multivibrator to respond in accordance with a signal applied to the data emitter electrodes of such pair of transistors;

c. second means, coupled to the control emitter electrode of the pair of transistors forming the second bistable multivibrator for enabling such multivibrator to respond to a signal applied to the data emitter electrodes of such pair of transistors; and d. a differential sensor connected between the collector electrodes of the pair of transistors forming the second bistable multivibrator of one of the plurality of storage stages for detecting the condition of such output bistable multivibrator by sensing the relative polarity of a voltage developed between such collector electrodes.

* * * * *

UNITED STATES PATENT OFFICE
CERTIFICATE OF CORRECTION

Patent No. 3,851,187 Dated November 26, 1974

Inventor(s) Henry C. Pao et al

It is certified that error appears in the above-identified patent and that said Letters Patent are hereby corrected as shown below:

In heading, after names of inventors, add

-- [73] Assignee Raytheon Company, Lexington, Mass. --

Column 1, line 68, delete "1of" and substitute therefor -- terminals of --

Column 4, line 9, change "soone" to -- one --.

Signed and Sealed this

*eleventh* Day of *November 1975*

[SEAL]

*Attest:*

RUTH C. MASON
*Attesting Officer*

C. MARSHALL DANN
*Commissioner of Patents and Trademarks*